July 13, 1937.  E. L. RICK  2,086,946
PLUG VALVE
Filed July 16, 1930   3 Sheets-Sheet 2
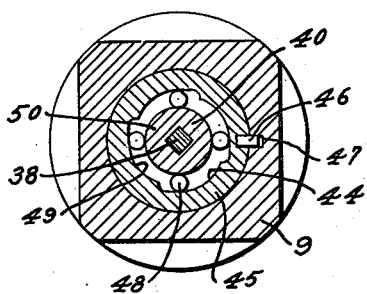
Fig. 6.
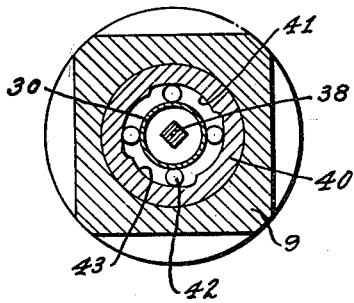
Fig. 6a.
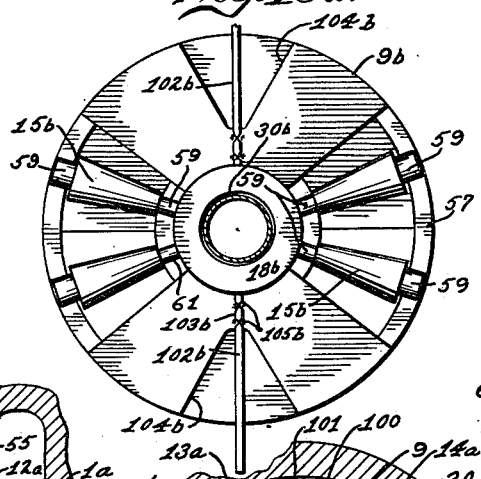
Fig. 10a.
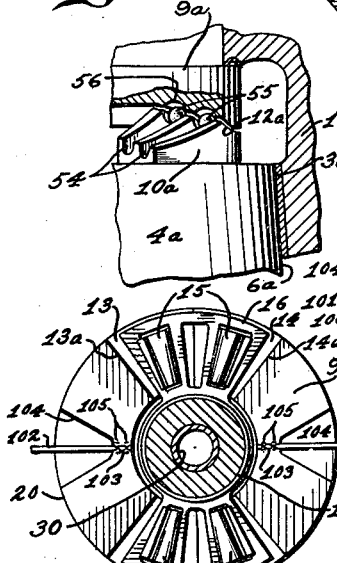
Fig. 9.
Fig. 7.
Fig. 8.
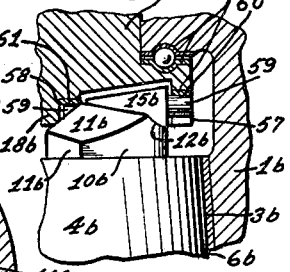
Fig. 10.
Inventor
Edward L. Rick.

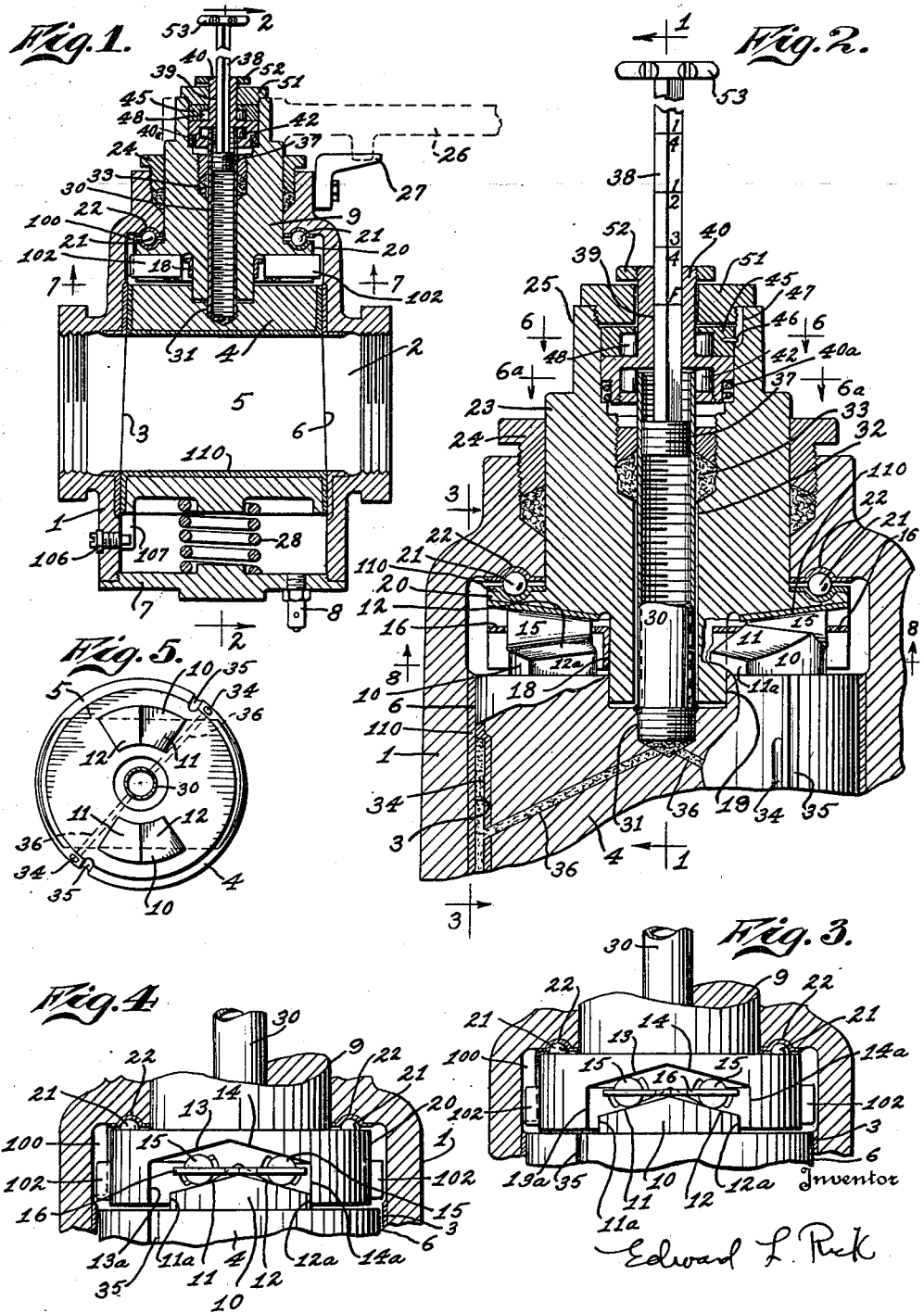

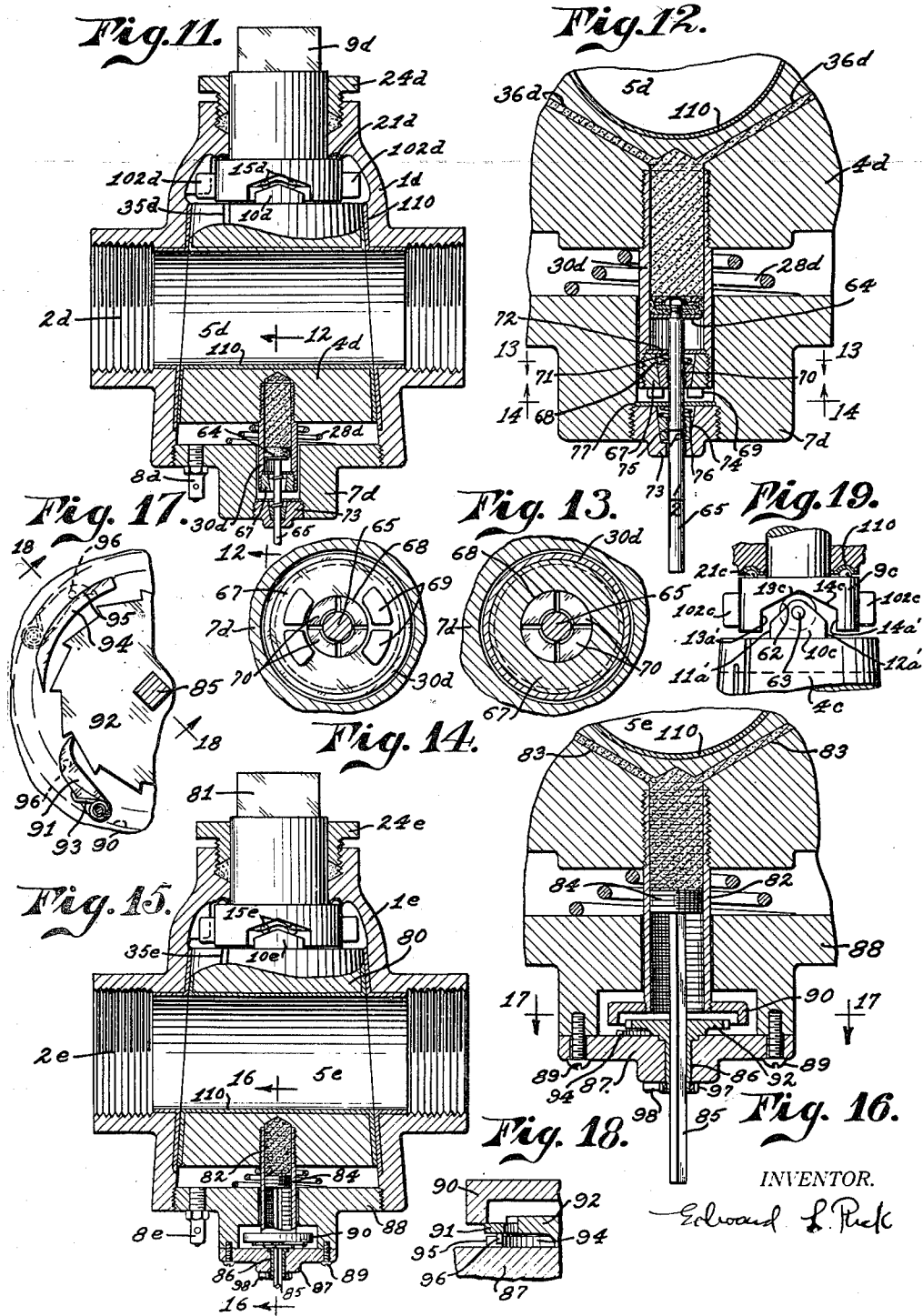

Patented July 13, 1937

2,086,946

UNITED STATES PATENT OFFICE 2,086,946

PLUG VALVE

Edward L. Rick, Los Angeles, Calif., assignor to Merco Nordstrom Valve Company, San Francisco, Calif., a corporation of Delaware Application July 16, 1930, Serial No. 468,391

19 Claims. (Cl. 251—93)

This invention relates to valves and similar devices, and in particular to a valve of the plug type in which a rotating plug within the valve casing alternately provides a passage for fluid between the inlet and outlet of the casing, or an obstruction to the passage of fluid depending upon its position within the casing.

This invention has for its object the provision of such a valve which will at all times be easy to rotate from open to closed position and in which the friction incident to the operation of the parts will be automatically reduced by the operation of rotating the operating means thereof.

A further object is to provide by the interposition of anti-friction means a movement of the coacting sealing surfaces between the valve closure member and the body in a preferential direction to decrease abrasion of such surfaces, and the consequent prolonging of the life of the sealing surfaces of the valve by the relief in pressure thus provided during the relative movement thereof.

Still another object is to separate these sealing surfaces so that a film of lubricant may be interposed between them prior to the movement of one of such surfaces on the other, and to likewise provide a means of supplying lubricant during such separation.

A further object is to provide a means of replenishing the lubricant supply within the valve body, which has been washed away by the action of fluids passing through the valve.

Another object is the provision of a lubricating system within the valve whereby the sealing surfaces of the valve plug will be automatically lubricated upon operation, so that a film of lubricant will always be left between the sealing surfaces after the valve has been operated.

Other objects will be apparent from the reading of the specification and will be finally pointed out in the claims.

Referring now to the drawings:

Figure 1 is a longitudinal section through one form of this invention in the open position taken on line 1—1 of Figure 2.

Figure 2 is a fragmentary section on line 2—2 of Figure 1 to a larger scale.

Figure 3 is a fragmentary section on line 3—3 of Figure 2 with the plug in seated position.

Figure 4 is a fragmentary section similar to Figure 3, illustrating the position of parts during operation.

Figure 5 is a plan view of the valve plug of the valve of Figure 1, showing the arrangement of cam surfaces thereon, the lubricant reservoir being shown in section.

Figure 6 is a section taken on line 6—6 of Figure 2.

Figure 6a is a section on line 6a—6a of Figure 2.

Figure 7 is a section taken on line 7—7 of Figure 1.

Figure 8 is a bottom plan view of the operating stem and roller carrier taken substantially on line 8—8 of Figure 2.

Figure 9 is a fragmentary section showing a modified form of anti-friction device.

Figure 10 is a view similar to Figure 9 showing another form of anti-friction device.

Figure 10a is a bottom plan view of the stem of Figure 10.

Figure 11 is a section similar to Figure 1 but showing a modified form of lubricant feeding device.

Figure 12 is an enlarged section taken on line 12—12 of Figure 11.

Figure 13 is a fragmentary section taken on line 13—13 of Figure 12.

Figure 14 is a fragmentary section taken on line 14—14 of Figure 12.

Figure 15 is a section similar to Figure 1 showing a further modified form of lubricant feeding device.

Figure 16 is an enlarged section taken on line 16—16 of Figure 15.

Figure 17 is a fragmentary top plan view taken on line 17—17 of Figure 16.

Figure 18 is a fragmentary section taken on line 18—18 of Figure 17.

Figure 19 is a fragmentary view similar to Figure 3 showing another modified form of stem and plug co-operating mechanism.

Referring now to Figures 1 to 8 inclusive: A valve body 1 is provided with a transverse fluid passage 2 and an internal recess provided with a tapered seating surface 3 for the valve plug 4. The plug 4 is provided with a fluid passage 5 which at certain positions of the valve plug will provide, with the passage 2, a continuous fluid way. At other positions of the plug 4 the passage 2 will be obstructed thereby. The plug is provided with an external conical surface 6 which accurately fits the surface 3. The valve body recess is provided with an entrance opening for the insertion of the plug and stem, and which is closed by the cap 7. A lubrication fitting 8 is provided for forcing lubricant into the space between the plug 4 and cap 7.

An operating stem 9 is provided for rotating the plug from open to closed position within which is provided means for automatically lubricating the seating surfaces. The engaging means between valve plug 4 and the stem 9 is so constructed that operating the stem to rotate the plug likewise separates the seating surfaces 3 and 6 so that the plug is easy to rotate and does not score these surfaces.

The engaging means comprises upwardly extending lugs 10 upon the top of the plug 4, each of which is provided with oppositely sloping helicoidal cam surfaces 11 and 12 terminating in substantially vertical abutment surfaces 11a and 12a respectively. The opposed portion of the stem 9 is provided with similar surfaces 13 and 14 terminating at substantially vertical abutment surfaces 13a and 14a for coaction with vertical surfaces 11a and 12a to limit the depression of the plug to a fixed amount. Between surfaces 11 and 13 and 12 and 14 are disposed anti-friction rollers 15, loosely carried by a retainer 16 which is journaled upon a downwardly extending projection 18 of the stem 9. This extension may likewise be journaled into plug 5 as indicated at 19.

The stem 9 is provided with a radially extending flange 20 on the bottom surface of which the cam surfaces 13 and 14 are formed. The opposite surface of this flange carries a ball thrust bearing 21 which abuts against a shoulder 22 on the valve body 1 at the end of the plug recess opposite the cap 7. Above the flange 20, rises a cylindrical portion 23 of the stem 9 which passes out of the body 1 through a packing gland 24. At its outer end it is provided with a wrench gripping surfaces 25 which may be square, pentagonal, or serrated, or of any other shape which will provide for preventing slippage of a wrench applied as shown at 26. Stops 27 are applied to the body 1 to limit rotation of the wrench and hence of the plug 5. A spring 28 may be employed below the plug 5 and bearing on the cap 7 to force the plug into sealing contact with the body, or the pressure of the fluid carried by the valve might be so utilized by providing an opening to the pressure side of the fluid passage 2. Such fluid pressure seating will be partially equalized in a manner to be described.

In order to insure that the relative movement between the stem 9 and plug 4, and the displacement of the plug caused thereby, will not maintain the plug in an unseated position subsequent to operation, a spring returning means is provided upon the stem 9. The normal tendency of the spring 28 acting through the surfaces 11 or 12, the rollers 15 and the surfaces 13 or 14 will normally tend to return the stem. If, however, the packing should be excessively tightened the small circumferential force available may not be sufficient. For this reason a direct return is provided in the means to be now described.

The wall of the body 1 is provided above the tapered seating surface 3 with lugs 100 (Figure 7) extending radially inwardly, and provided with radial contact surfaces 101. Fixed to the stem 9 are leaf springs 102 which contact with the stem, and the surfaces 101 in the open position, and with others when in the closed position of the valve. These springs are set into radial slots 103 in the bottom surface of the stem, and the metal adjacent to the outer end of the slot is removed, as at 104, to provide for deflection of the spring 102. The slots 103 are of just sufficient width to accommodate the width of the spring 102, but are of slightly greater depth, so that the spring may be locked by displacement of the metal around it, as illustrated at 105. This may be accomplished by center punching or by indenting with a chisel or other suitably shaped tool.

A stop 106 (Figure 1) is threaded into the body 1 at the large end after assembly and contacts with faces 107, located on the plug to insure alinement of the passages 2 and 5 in open position and correct positioning of plug and body in the closed position. The stops 27 are so located as to permit a slight over travel of the wrench 26. The springs 102 will contact the faces 101 prior to the wrench striking the stop 27. A continued movement to position the plug will deflect the springs 102. Removal of pressure from the wrench 26 will cause return of the stem a slight distance, relieving the pressure between the rollers and the surfaces 11 and 13 or 12 and 14, permitting the plug to seat under the action of the spring 28.

To better bring out the operation of the lubricating means, the operation of the valve will now be described. Supposing the valve plug 4 to be tightly wedged within the tapered bore seating surface 3. Rotating the stem 9 by means of the wrench 26, either the cam surfaces 13 or 14 will operate to rotate the rollers 15 into contact with surfaces 11 or 12 respectively, depending upon the direction of rotation. Further rotation will create a pressure between these surfaces and the roller between them having a vertical component tending to force the plug downwardly to release it from the seating surface 3. The upward thrust on the stem is taken by the ball bearing 21. This unseating tendency will persist with increasing force as increasing pressure is applied to the wrench handle until the plug has been forced downwardly far enough to release the plug surfaces 6 from the body surface 3 and thus decrease the resistance to rotation allowing the plug to turn within the body free from injurious contact with it. When the stem 9 has been rotated far enough to bring surface 13a in contact with surface 11a (or 14a in contact with 12a), continued rotation in the same direction will allow the direct rotative force to be transmitted from the wrench to the plug without effecting additional vertical displacement of the plug. The displacement already obtained will be maintained, however, during continued turning until the wrench handle is released by the operator.

It is a particular feature of this invention to provide means for utilizing relative movement between the plug and the stem 9 to effect lubrication of the seating surfaces. In the embodiment shown in Figures 1 to 8 inclusive both the relative rotary movement and the relative vertical movement between plug 5 and the stem 9 are utilized to supply and distribute lubricant. In the form shown in Figures 11 to 14 inclusive, the vertical movement of the plug in the body is used both to supply and distribute lubricant. The form shown in Figures 15 to 18 inclusive utilizes the rotary movement between body and plug for the supply of lubricant and the vertical movement for its distribution.

In Figures 1 to 8 inclusive, means for automatically lubricating the valve comprises the following: A lubricating tube 30 is threaded and welded into a bore 31 in the top of the plug 5, and extends upwardly through a bore 32 in the stem 9 and through a packing gland 33 therein. In the outer sealing surface 6 of the plug are formed blind grooves 34. Other grooves 35 are also formed in the surface 6 extending from end to end of the plug and affording a limited passage for lubricant between the body recess at one end of the plug and that at the other. The blind grooves 34 are connected with passages 36 to the bore 31, which in turn communicates with the interior of the tube 30. The tube 30 is internally threaded for the reception of an externally threaded piston 37. A squared rod 38 is rigidly connected to the top of the piston and extends freely through a squared hole 39 in the elongated hub of a clutch spool 40.

Clutching means is arranged in the upper portion of the stem for alternately causing relative rotation between the squared rod 38 and the piston 37 connected thereto and the tube 30. The threads on the piston 37 and tube 30 are of such a hand that this relative movement in the one direction of rotation causes a feeding movement of the piston downwardly through the tube to discharge lubricating material therein through the passages 36 to the grooves 34. The lubricant is therefore discharged in a direct ratio to the amount of relative movement between the plug and the stem. This relative movement is likewise in proportion to the resistance offered by the plug in turning in its seat, so that lubricant is supplied in a ratio depending upon the lubrication required.

For example, if the valve has been in service in one position for a long period of time and the lubricant has been washed from the surfaces, the plug will stick much more tightly to its seat than if operation of the valve had been more frequent. An attempt to turn the valve in this condition will result in the maximum relative movement between the stem and plug, and hence a maximum discharge of grease in the grooves. If the plug has been frequently operated, a considerable quantity of lubricant will remain on the seating surfaces, and the plug will operate easily with very little relative movement. In the latter case but a slight amount of lubricant will be supplied, if any.

This clutching means is constructed as follows: Within the lower flange of the spool 40 is contained a friction clutch or roller ratchet 41, shown in section in Figure 6a. This ratchet is of the usual construction of rollers 42 and eccentric internal cam surfaces 43 on the spool 40, arranged to grip or release the tube 30, depending upon the direction of rotation of the tube 30, the clutch spool 40 being loose with respect to the stem 9. A second roller ratchet 44, shown in section in Figure 6, has an external member 45 keyed to the stem 9 by a pin 46 coacting with the side surfaces of a groove 47, and provided with rollers 48 and internal cam surfaces 49, arranged to grip the reduced portion 50 of the clutch spool 40 upon clockwise rotation of the stem 9, and to release upon opposite rotation thereof.

It will be seen that upon right hand rotation of the stem 9, the ratchet 41 will be free, but that the drum 45 will rotate with the stem and the cam surfaces thereon will cause the rollers 48 to engage the hub of spool 40 thus rotating squared rod 38 relative to tube 30 when relative motion occurs between stem 9 and plug 5. Should the plug require considerable depression before movement, the stem will rotate until the surface 14a comes in contact with the surface 12a, effecting a relative rotation of the piston 37 within the tube 30, and a consequent advancement thereof. The tube 30, it will be understood, has been filled with lubricant in a manner to be now described. To allow for vertical movement of the plug 4 and tube 30, the clutch spool is supported on a spring 40a.

The squared rod will thus move up and down, relative to the top of the stem, in accordance with the piston 37 within the tube. Indicia are inscribed upon the rod, so that the amount of lubricant remaining in the tube may be ascertained. A retainer cap 51 closes the clutch recess in the stem 9 and through a central bore therein presses the reduced portion 50 of the clutch spool. Above the cap the clutch spool is provided with a nut 52, threaded thereon. To fill the tube 30 with lubricant, the cap 51 is loosened. The entire clutch assembly may thereupon be raised out of the tube and the piston threaded out by means of a hand wheel 53 on the end of the rod 38. After the tube 30 has been filled with lubricant, reversal of the procedure will reassemble the device for operation.

By suitable clutch construction, lubrication of the seating surfaces may be accomplished, either just prior to the opening, or prior to the closing of the valve. Omission of the stop 27, so that continuous rotation of the plug is possible, will permit lubrication of the valve at each operation, whether prior to opening or to closing of the valve.

Various other forms will now be described in which similar parts not otherwise referred to are designated by the same numeral with varying reference letters. In Figure 9 is shown a modified form of the anti-friction device between the stem and plug. In this form projection 10a arising from the plug 4a, are provided with grooves 54 for the reception of balls 55. Similar grooves 56 are provided in the stem 9a. The bottoms of these grooves have the same profile as the surfaces 11, 12, 13, and 14 respectively.

In Figure 10 the stem 9b is provided with a depending extension 57 on the outer periphery, and a similar extension 58 adjacent to the central projection 18b. The rollers 15b are provided with gudgeons 59 at either end, which are loosely journaled in slots 60 and 61, provided in the extensions 57 and 58 respectively. The plug construction is the same as that shown in Figures 1 to 8 inclusive.

In Figure 19 the stem 9c is provided with cam surfaces 13c and 14c, and vertical surfaces 13a' and 14a'. The plug 4c is provided with an extension 10c, within which is contained a roller 62, journaled upon a pin 63. The roller contacts with the surfaces 13c or 14c, depending upon the rotation of the stem, and serves to force the plug 4c downwardly in the same manner as the rollers 15. Projection 10c is likewise provided with surfaces 11a' and 12a', having the same function as the surfaces 11a and 12a.

In the construction shown in Figures 11 to 14 inclusive, the body and plug construction are similar throughout to those of Figures 1 and 2, with the exception that the lubricating device is provided within the cap 7d, and is operated by vertical displacement of the plug. The stem 9d in this case may be solid, and the lubricating tube 30d is attached to the bottom of the plug 4d, communicating with the grooves 34 through passages 36d. The spring 28d may be employed for seating. The lubricating tube 30d is provided with a smooth bore for the reception of a cup piston 64, to which is attached a round piston rod 65, which is provided with indicia, similar to those on the rod 38. The lower end of the tube 30d is provided with a spider bushing 67, having a tapered bore therein as at 68, the longer diameter thereof being at the top. This bushing is provided with lugs 69 for the reception of a wrench or other devices for replacement or removal. Received within the tapered bore 68 are slips 70, pressed downwardly by a spring 71, resting against a thrust plate 72, retained within the tube 30d by the bushing 67. The slips 70 are arranged to grip the rod 65, and may be provided with a slightly serrated surface.

A second bushing 73 is provided centrally in the cap 7d, having a similar tapered bore 74, slips 75 likewise adapted to grip the rod 65, spring 76 to force the slips downwardly, and a thrust plate 77.

The operation of this device is as follows: As the plug moves downwardly under the actions of the cam surfaces on the stem and plug, the slips 70 will open, while the slips 75 will grip the rod. The tube 30d will thus be forced downwardly over the piston 64, forcing lubricant through the passages 36d to the grooves 34. As the plug moves upwardly under the action of spring 28d, after operating pressure is removed from the wrench handle, the slips 70 will grip the rod, pulling it upwardly with the plug, while the slips 75 will open, releasing the rod.

In the form shown in Figures 15 to 18 inclusive, the differential motion between the body and the plug is used to effect lubrication.

A plug 80 operates with the body 1e in co-operation with a stem 81 in a manner similar to that previously described. An internally threaded tube 82 is threaded into the bottom of the plug and connects with ducts 83 which connect with grease grooves 34 as in the other forms herein described. Within this tube an externally threaded piston 84 is disposed which is provided with a squared piston rod 85 which extends downwardly therefrom and slides through a square bore in a thimble 86 mounted for rotation in a cover plate 87. The plate 87 is fixed to the cap 88 which closes the body recess, as by screws 89.

The lower end of the tube 82 is provided with a head 90 upon which is mounted a depending pawl 91 adapted to engage a ratchet 92, slidably mounted upon the piston rod 85 and adapted to effect rotation thereof. A spring 93 normally holds the pawl 91 in contact with the ratchet. A shield 94 is mounted upon the plate 87 which has a cam surface 95 thereon adapted to co-operate with a pin 96 on the pawl to withdraw the pawl from the ratchet after a predetermined movement thereof as best illustrated in Figure 17.

External the plate 87 the thimble 86 is provided with ratchet teeth 97 holding in the same direction as those of the ratchet 92 and coacting with a pawl 98 pivoted to the plate 87 to prevent return movement of the piston on reverse motion of the valve. Thus rotation of the plug back and forth will intermittently cause differential motion between the piston and the tube. The threads on piston and tube and the ratchet teeth and pawl operate in such a direction that the piston is fed upwardly into the tube to expel lubricant therefrom into the lubricating grooves 34.

To insure the maximum serviceability of the valve, the plug and body are made of a steel containing aluminum or an aluminous surface so that contact surfaces can be subsequently hardened by exposure to ammonia gas under the influence of a temperature below normal heat treating temperatures to create extremely smooth glass hard relatively frictionless contact surfaces which will maintain a good film of lubricant under extreme pressure conditions. These surfaces are indicated at 110.

The entire inside of the valve may be initially filled with lubricant through the lubrication fitting 8, which is of the usual check valve type for pressure lubrication. Lubricant through the fitting enters the lower chamber and through the grooves 35 may enter the upper chamber. Any fluid pressure exerted on the plug is likewise practically equalized through the grooves 35 excepting the projected area of the tapered seating surfaces. When the plug is displaced by the movement of the stem the displacement below forces lubricant up through the valve and around the slight space between the contact surfaces which appears during the plug displacement. Likewise the lubricant is forced through the grooves 35 to equalize pressures above and below the plug. The lubricating device in addition supplies at each movement additional lubricant to keep the valve body full and the plug lubricated.

It will be understood that in the forms of the invention described above, in which the relative movements between the parts effect the lubrication of the valve that a variation in the quantity of lubrication fed may be varied by changing the pitch of the thread into tube 30. Likewise it will be understood that there is a normal operating play existing between the rollers 15 and the co-acting cam surfaces. Increase of the play likewise increases the lost motion between the operating means and the plug, and thus increases the amount of lubricant which is supplied. Various modifications, changes, and variations in the structure of this invention may be made without departing from the true spirit of the invention, as pointed out in the following claims. Although the description has been limited to plug valves, the invention is applicable to other types of valves and closure members in which automatic lubrication is desired.

Having thus described my invention, I claim:

1. A valve including a body having a fluid passage therethrough, a valve plug for controlling such passage, operating means for operating said valve plug, said valve plug having a lubricant reservoir associated therewith, lubricating means coacting with said valve plug and said operating means to force lubricant from said reservoir to lubricate the valve plug, said valve plug being provided with lubricating grooves on its external surface extending axially throughout its length, and additional blind grooves on its external surface connected with said lubricant reservoir, said valve body being formed to provide closed chambers at the ends of the valve plug communicating with said first named lubricating grooves.

2. In a plug valve, a casing provided with a passageway therethrough for flow of fluid and also formed to provide a tapered seat transversely of the passageway, means for resiliently urging the valve plug into its seat, an operating head journaled with respect to the casing at the small end of the plug, means serving to definitely limit angular movements of said head between certain limiting positions, lost motion means interconnecting said head and said plug, whereby upon rotation of said head in either direction, force components are transmitted to said plug tending to rotate the same and move the same longitudinally, and resilient means acting between the plug and the valve casing, tending to rotate the head a limited amount relative to the plug when said operating head is rotated to one of its limiting positions.

3. In a plug valve, a casing having a passageway therethrough for flow of fluid and formed to provide a tapered valve seat extending transversely of the casing, a tapered plug in said seat, an operating head journaled with respect to the casing and having its inner end terminating adjacent the small end of the plug, the inner end of the head being separate from the plug but having a driving connection therewith, a tube extending axially through said head and having its inner end secured to the adjacent end of the plug, sealing means serving to prevent leakage between said tube and said operating head, said tube being adapted to receive lubricant under pressure, and lubricant ducts formed within the plug serving to establish communication between the inner end of said tube and the valve working surfaces.

4. In a plug valve, a casing provided with a passageway therethrough for flow of fluid and formed to provide a tapered valve seat extending transversely of the passageway, a tapered valve plug rotatably disposed within said seat, a rotatable operating head extending into said casing and adapted to rotate about an axis aligned with the axis of the plug, the inner end of said head being detached with respect to the plug but having a driving connection therewith, a tube extending through said head and aligned with respect to the axis of the plug, the inner end of said tube being secured to said head, said tube being adapted to receive lubricant under pressure, and lubricant ducts formed within said plug serving to convey lubricant from the inner end of said tube to the valve working surfaces.

5. In a plug valve, a casing provided with a passageway therethrough for flow of fluid and also being formed to provide a tapered seat extending transversely of the passageway, a plug in said seat, an operating head journaled within the casing and adapted to turn upon an axis aligned with respect to the axis of the plug, said operating head being separate from the plug but having a driving connection therewith, a tube extending through said head and aligned with respect to the axis of the plug, the inner end of said tube being secured to the adjacent end of the plug, a lubricant pressure screw threaded into said tube from the exterior of the casing, and lubricant ducts formed in said plug serving to convey lubricant from the inner end of said tube to the valve working surfaces.

6. In a plug valve, a casing provided with a passageway theerthrough for flow of fluid and also having a valve seat formed transversely of the passageway, a plug in said seat, an operating head journaled with respect to the casing, mechanical thrust transmitting elements interposed between the inner end of said head and said plug, and serving to transmit both torsional and longitudinal force components to the plug upon turning the head, whereby the plug can be jacked from its seat upon turning the head, and means operating automatically responsive to turning of the head for injecting lubricant between the valve working surfaces.

7. In a plug valve, a casing having a passageway therethrough and a tapered seat transverse of the passageway, a tapered valve plug rotatably disposed within said seat, a lubricant reservoir, blind lubricant ducts extending longitudinally in the seating surface of the plug and casing, and connected with said reservoir, and lubricant ducts adjacent thereto extending substantially the full length of said plug.

8. In a plug valve, a casing provided with a passageway therethrough for flow of fluid, a tapered seat extending transversely of said passageway, a plug in said seat, an operating head journaled within said casing, mechanical thrust transmitting elements interposed between the inner end of said head and said plug, and serving to transmit both torsional and longitudinal force components to the plug upon turning the head, a tube extending through said head and likewise aligned with respect to the axis of the plug, the inner end of said tube being secured to the adjacent end of the plug, a lubricant pressure screw threaded into said tube from the exterior of the casing, means automatically responsive to the turning of said head for advancing said pressure screw, and lubricant ducts formed in said plug serving to convey lubricant from the inner end of said tube to the valve working surfaces.

9. In a plug valve, a casing provided with a passageway therethrough for line fluid, a tapered seat extending transversely of said passageway, a plug in said seat, an operating head separate therefrom extending from said casing and carrying a lubricator plunger, and lubricating means including frictional plunger operating means to alternately lubricate the seating surfaces of the plug and body as the operating head is turned to open and close the valve.

10. In a plug valve, a casing provided with a passageway therethrough for line fluid, a tapered seat extending transversely of said passageway, a plug in said seat, an operating head separate therefrom extending from said casing, a tube extending from said plug through said head, a plunger in said tube, ratchet plunger rotating means alternately grasping and releasing said plunger as the valve is opened and closed, and ratchet means alternately grasping and releasing said tube as the valve is closed and opened respectively.

11. In a plug valve, a casing provided with a passageway therethrough for flow of fluid and having a tapered seat extending transversely thereof, a tapered plug in said seat, a separate operating head journalled in the casing, cam means between the operating head and plug for moving the plug axially upon rotation of the operating member, means limiting the axial movement of said plug to cause joint rotation of said plug and operating head, a lubricant system comprising a lubricant reservoir secured to said plug and extending through said head, a plunger in said reservoir for feeding lubricant, and packing means around the head and lubricant reservoir to prevent leakage.

12. A valve provided with a valve housing having a valve seat, a valve member movable on said seat, an operating member whereby the valve is opened and closed, a lubricant chamber adapted to communicate with said valve seat, an operating member to control the delivery of lubricant from said chamber to said valve seat, and means whereby motion is transmitted from one of said operating members to the other so as to lubricate said seat in an amount proportional to the degree of resistance of said valve to operation.

13. A valve provided with a valve housing having a valve seat, a valve member movable on said seat, an operating member whereby the valve is opened and closed, a lubricant chamber adapted to communicate with said valve seat, an operating member to control the delivery of lubricant from said chamber to said valve seat, said operating members being movable in different directions to operate and at the same time lubricate the valve member, and means whereby power is transmitted from one of said operating members to the other, so as to simultaneously move said operating members in said different directions.

14. A valve provided with a valve housing having a valve seat, a valve member movable on said seat, an operating member movable in an arcuate path to open and close the valve, a lubricant chamber adapted to communicate with said valve seat, an operating member movable into said chamber to force the lubricant from said chamber to said valve seat, said operating members being movable in different directions to operate and at the same time lubricate the valve member, and means whereby power is transmitted from one of said operating members to the other, so as to simultaneously move said operating members in said different directions.

15. A self lubricating valve comprising a valve housing having inlet and outlet ports, a valve member adapted to occupy an open and a closed position in said valve housing, operating means to open and close said valve, a lubricant chamber in communication with said valve member, a pressure member in said lubricant chamber, and means to provide for the transmission of power from said valve operating means to said pressure member to force the lubricant from said chamber onto said valve member in an amount in proportion to the degree of resistance of said valve member to movement.

16. A valve including a body having a fluid passage therethrough, a closure member for controlling said fluid passage, means for operating said closure member separate therefrom and extending into said body, said closure member having a lubricant reservoir connected therewith and extending through said operating means, lubricating means coacting with said closure member and said operating means, said lubricating means including a plunger operable in said reservoir, and ratchet means connecting said plunger and said operating means whereby said plunger is advanced into said reservoir to force lubricant from said reservoir to lubricate said valve upon actuation of said operating means.

17. A valve including a body having a fluid passage therethrough, a closure member for controlling said fluid passage, means for operating said closure member, said closure member having a lubricant reservoir connected therewith, means coacting with said operating means to force lubricant from said reservoir to lubricate said closure member upon actuation of said operating means in an amount in proportion to the degree of resistance of said valve member to movement, and an indicator cooperative with said coacting means whereby the quantity of lubricant in the reservoir is indicated.

18. A valve including a body having a fluid passage therethrough, a closure member in said body for controlling said fluid passage, means for operating said closure member, means for lubricating said closure member and means operatively connecting said operating means and said lubricating means whereby the extent of operation of the latter is dependent on the degree of resistance of said closure member to movement by said operating means.

19. A plug valve including a casing having a fluid passage therethrough, a plug in said casing for controlling said fluid passage, means for rotating said plug, means for lubricating said plug including a lubricant cylinder and a plunger therein and means operatively connecting said plug rotating means and said plunger whereby the extent of operation of the latter is proportional to the degree of resistance of said plug to rotation by said plug rotating means.

EDWARD L. RICK.